Patented July 29, 1924.

1,502,849

UNITED STATES PATENT OFFICE.

JACOB EHRLICH, OF BELLEVILLE, NEW JERSEY, ASSIGNOR TO VERONA CHEMICAL CO., OF NORTH NEWARK, NEW JERSEY, A CORPORATION OF NEW JERSEY.

PROCESS FOR THE PRODUCTION OF NITROSO-META-CRESOL AND ITS APPLICATION TO THE SEPARATION OF META-CRESOL AND PARA-CRESOL.

No Drawing. Application filed March 11, 1922. Serial No. 542,865.

*To all whom it may concern:*

Be it known that I, JACOB EHRLICH, a citizen of the United States, residing at Belleville, in the county of Essex and State of New Jersey, have invented new and useful Improvements in Processes for the Production of Nitroso-Meta-Cresol and its Application to the Separation of Meta-Cresol and Para-Cresol, of which the following is a full, clear, and exact specification.

My invention relates to the production of nitroso-meta-cresol and the use of this compound as a means for separating meta-cresol from para-cresol.

The separation of the valuable meta-cresol from mixtures of ortho-cresol and para-cresol has presented many difficulties and has prevented the production of the meta-cresol in an economical manner.

While ortho-cresol can be readily separated from the meta and para compounds by fractional distillation, this method can not be employed for the separation of the meta and para cresols and various processes have been suggested for this purpose, all of which are comparatively intricate and expensive.

I have discovered a process whereby the nitroso-compound of meta-cresol may be produced in the presence of para-cresol without the production of the nitroso-compound of the latter, and whereby advantage may be taken of the insolubility of the nitroso-meta-cresol in compounds which dissolve the para-cresol and the by-products of the reaction.

By my process, therefore, a mixture of meta-cresol and para-cresol may be so treated as to form the insoluble nitroso-meta-cresol which can be readily removed from the soluble para-cresol and the by-products of the reaction.

The process of my invention has many manufacturing, commercial and economic advantages which will be evident upon a consideration of my specification and claims.

I have found that if meta-cresol, or a mixture of meta-cresol and para-cresol, be treated with sodium nitrite in a strong non-nitrifying acid solution, with or without the presence of an inert solvent, nitroso-meta-cresol is readily formed in practically quantitative quantities and that nitroso-para-cresol, under the conditions of my process, is not formed and that hence the soluble para-cresol and the by-products of the reaction can be readily removed from the insoluble nitroso-meta-cresol and that the latter may be easily converted into meta-cresol.

As an example for the production of nitroso-meta-cresol and its separation from para-cresol, I give the following:—

To a mixture of 330 parts by weight of sulfuric acid 60%; 27 parts by weight of toluol and 28 parts by weight of a mixture of cresols containing 57% meta-cresol and 43% para-cresol, I add a concentrated solution of sodium nitrite (approximately a 36% solution) containing 12.5 parts by weight of sodium nitrite. The sodium nitrite solution is added slowly and with constant vigorous stirring, the mixture being maintained at approximately 0° C. The mixture is stirred for about five minutes after the sodium nitrite has been introduced and is then filtered. The precipitate is washed with water to remove the sulfuric acid and then with toluol to remove the original toluol solution with its dissolved compounds. The remaining nitroso-meta-cresol is then dried and appears as a light yellow micro-crystalline powder.

The above is given as a specific example and the quantities, concentrations, temperature, amounts and chemicals stated therein may be varied without going beyond the scope of my invention.

The sulfuric acid need not be of the specific strength given, but I have found that appreciably weaker acid produces smaller yields and that appreciably stronger acid is liable to cause a sulfonation of the cresols and an undesirable increase in heat during the addition of the nitrite solution. The quantity of the acid may be increased or decreased without any material deleterious effect upon the process, but an appreciable increase of strength of the acid is to be avoided. Further, other acids may be employed, as, for instance, the sulfuric acid mentioned in the example may be substituted by 265 parts by weight of hydrochloric acid, 36%.

The process can be followed in the absence of toluol, but the reaction proceeds more smoothly and the stirring can be accomplished without the formation of lumps and agglomerations, which are liable to be formed when toluol, or other suitable medium, is not present. Other inert solvents, which will dissolve para-cresol and the by-products of the reaction can be used instead of toluol, but naturally they must be of such a character that they will not freeze at the temperature of the reaction.

The process of my invention is applicable to any relative mixtures of meta-cresol and para-cresol, especially to those containing from 10% meta-cresol to 100% meta-cresol, in the latter case, my process presenting a new and valuable method for the production of nitroso-meta-cresol from meta-cresol.

A low temperature should be employed during the introduction of the nitrite solution, and while fairly good yields may be obtained at 20° C., a lower temperature is preferable because of the production of a purer product and increased yields.

The amount of sodium nitrite added should be calculated upon the amount of meta-cresol in the cresol mixture employed and other nitrites producing nitrous acid may be used, or nitrous acid anhydrid in gaseous form may be employed.

Any inert solvent may be used in washing the filtered nitroso-meta-cresol which will dissolve the solvent used in the process and the by-products of the reaction, among which are toluol, benzol, xylol, solvent naphtha, &c.

By "non-nitrifying" acids in my specification and claims, I mean those acids which when employed in my described process will not form nitro-compounds.

The conversion of the nitroso-meta-cresol into meta-cresol or meta-cresol derivatives may be accomplished in any suitable manner and is not a part of this present invention.

By "inert solvents" I mean those chemicals which will dissolve the para-cresol and the produced by-products but which will not dissolve the nitroso-meta-cresol.

What I claim is:—

1. A process for the production of nitroso-meta-cresol which comprises treating meta-cresol and strong sulfuric acid with nitrous acid without causing sulfonation.

2. A process for the production of nitroso-meta-cresol which comprises treating a mixture of meta-cresol, an inert solvent and strong non-nitrifying acid with nitrous acid without causing sulphonation.

3. A process for the production of nitroso-meta-cresol which comprises treating a mixture of meta-cresol and para-cresol with nitrous acid in the presence of a non-nitrifying acid, producing nitroso-meta-cresol and removing the para-cresol and by-products from the nitroso-meta-cresol.

4. A process for the production of nitroso-meta-cresol which comprises treating a mixture of meta-cresol and para-cresol with nitrous acid in the presence of sulfuric acid without causing sulphonation, producing nitroso-meta-cresol and removing the para-cresol and by-products from the nitroso-meta-cresol.

5. A process for the production of nitroso-meta-cresol which comprises treating a mixture of meta-cresol and para-cresol with nitrous acid in the presence of a non-nitrifying acid and an inert solvent and separating the produced nitroso-meta-cresol from the para-cresol, the by-products, the inert solvent and the acid.

6. A process for the production of nitroso-meta-cresol which comprises treating a mixture of meta-cresol and para-cresol with nitrous acid in the presence of sulfuric acid and an inert solvent without causing sulphonation and separating the produced nitroso-meta-cresol from the para-cresol, the by-products, the inert solvent and the acid.

7. A process for the production of nitroso-meta-cresol which comprises treating a mixture of meta-cresol and para-cresol with nitrous acid in the presence of sulfuric acid at a temperature sufficiently low to prevent sulfonation and separating the produced nitroso-meta-cresol from the para-cresol, the by-products and the acid.

8. A process for the production of nitroso-meta-cresol which comprises treating a mixture of meta-cresol and para-cresol with nitrous acid in the presence of sulfuric acid and toluol without causing sulphonation and separating the produced nitroso-meta-cresol from the other chemicals and products of the process.

9. A process for the production of nitroso-meta-cresol which comprises treating a mixture of meta-cresol and para-cresol with sodium nitrite in the presence of sulfuric acid, maintaining the temperature below the sulfonation point and filtering the produced nitroso-meta-cresol from the other chemicals and products of the reaction.

10. A process for the production of nitroso-meta-cresol which comprises treating a mixture of meta-cresol and para-cresol with sodium nitrite in the presence of an inert solvent and sulfuric acid, maintaining the temperature below the sulfonation point and filtering the produced nitroso-meta-cresol from the other chemicals and products of the reaction.

11. A process for the production of nitroso-meta-cresol which comprises treating a mixture of meta-cresol and para-cresol with sodium nitrite in the presence of sulfuric acid and toluol, maintaining a temperature of approximately 0° C., filtering the insoluble nitroso-meta-cresol and removing the acid, toluol, soluble para-cresol and by-products from the nitroso-meta-cresol.

Signed at Belleville, in the county of Essex and State of New Jersey, this 8th day of March, 1922.

JACOB EHRLICH.